(12) United States Patent
Bazargan et al.

(10) Patent No.: US 6,300,839 B1
(45) Date of Patent: Oct. 9, 2001

(54) FREQUENCY CONTROLLED SYSTEM FOR POSITIVE VOLTAGE REGULATION

(75) Inventors: Hassan K. Bazargan; Farshid Shokouhi, both of San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/644,286

(22) Filed: Aug. 22, 2000

(51) Int. Cl.[7] .................................................. G05F 1/40
(52) U.S. Cl. ................................................. 331/57; 323/280
(58) Field of Search .............................. 365/189.09, 227, 365/226; 327/536, 538, 535; 331/57, 1 A; 323/280

(56) References Cited

U.S. PATENT DOCUMENTS

| | | |
|---|---|---|
| 5,519,360 | 5/1996 | Keeth . |
| 5,553,030 | 9/1996 | Tedrow et al. . |
| 5,670,907 * | 9/1997 | Gorecki et al. ........................ 327/535 |
| 5,847,552 | 12/1998 | Brown . |
| 5,852,359 | 12/1998 | Callahan, Jr. et al. . |
| 5,889,440 * | 3/1999 | Kowshik ................................ 331/57 |
| 6,018,264 | 1/2000 | Jin . |
| 6,064,250 * | 5/2000 | Proebsting ........................... 327/536 |
| 6,154,411 * | 11/2000 | Morishita ............................. 365/226 |

* cited by examiner

*Primary Examiner*—Shawn Riley
(74) *Attorney, Agent, or Firm*—Jeanette S. Harms; Bever Hoffman & Harms

(57) ABSTRACT

In a charge pump system, the frequency of an oscillator is based on the output signals from a plurality of differential amplifiers. Each differential amplifier receives a different reference voltage as well as a common input voltage derived from the pumped voltage. A predetermined logic signal output by the differential amplifiers modifies, i.e. reduces, an original frequency of the oscillator. In this manner, the charge pump system quickly compensates for any overshoot in the pumped voltage in a manner directly correlated to the magnitude of the pumped voltage. If no differential amplifiers output the predetermined logic signal, then the oscillator generates the original frequency. In this manner, the charge pump system also compensates for any undershoot in the pumped voltage by providing the fastest frequency.

9 Claims, 9 Drawing Sheets

FREQUENCY CONTROLLED SYSTEM FOR POSITIVE VOLTAGE REGULATION

FIELD OF THE INVENTION

The present invention relates to regulating a positive voltage on an integrated circuit, and specifically to regulating this positive voltage by slowing down an oscillator.

RELATED ART

Charge pumps are well known in the art of integrated circuits. In standard applications, a charge pump provides a voltage more positive than the most positive external power supply voltage.

FIG. 1A illustrates a known prior art charge pump system 100 including an oscillator 120, a latch circuit 130, and a pump 140. Oscillator 120 has a plurality of inverter stages 120(1)–120(12) connected in series. The output terminal of the last inverter stage 120(12) is coupled to an input terminal of latch circuit 130.

To disable ring oscillator 120, an input signal 135 is pulled high. In the disable mode, the last output signal of a NAND gate 132 is latched by cross-coupled NAND gates 132 and 134. To enable ring oscillator 120, input signal 135 is pulled low. In the enable mode, latch circuit 130 acts as an inverter, thereby acting as the final inverter stage of oscillator 120. Specifically, when input signal 135 is low, NAND gate 134 will output a logic one regardless of the signal at its other input terminal. Therefore, NAND gate 132 functions as an inverter. It logically follows that, inverter 131, NAND gate 132, and inverter 134 also act as an inverter. The output signal of latch circuit 130 is provided as a feedback signal to node 110, which is coupled to the first inverter stage 120(1) of oscillator 120. In this manner, an oscillation is generated by charge pump system 100. The output signal of latch circuit 130 is also provided to a pump 140.

FIG. 1B illustrates one embodiment of pump 140. The ring oscillator (such as oscillator 120 in FIG. 1A) provides a square wave signal 141 that oscillates between approximately supply voltage Vcc and ground. An inverter 142 sharpens the edges of signal 141. A transistor 144 has its source coupled to capacitor 143 and its gate and drain coupled to Vcc. Therefore, transistor 144 acts as a weak pull-up device.

When signal 141 is approximately Vcc, the output signal of inverter 142 is low. Therefore, capacitor 143 does not discharge and transistor 144 provides a weak pull-up voltage on node 147 of Vcc minus the threshold voltage of transistor 144. When signal 141 is low, the output signal of inverter 142 is high, thereby coupling node 147 to a value higher than Vcc. The discharge of capacitor 143, via conducting transistor 145, provides an output voltage on node 146 of Vcc plus an additional boost, ΔV, provided by capacitor 143. FIG. 1B illustrates a typical waveform of pump 140 at node 146 that varies between approximately Vcc and Vcc+ΔV.

Note that transistors 144 and 145 function like diodes, as known by those skilled in the art, and are not described in detail herein. However, detailed information regarding charge pump system 100 is provided in U.S. Pat. No. 5,519,360, which is incorporated by reference herein.

Input signal 135 (FIG. 1A) is provided by a regulator circuit (not shown) which monitors the voltage on node 146. If the voltage is below a predetermined amount, when the circuit provides a low input signal 135, thereby enabling oscillator 120 to charge pump 140. If the voltage is above a predetermined amount, then the circuit provides a high input signal 135, thereby disabling oscillator 120 and thus turning off pump 140. Therefore, particularly in cases where a high programming voltage is required on-chip, the voltage on node 146 varies considerably over time. Thus, this method may cause an undesirable voltage ripple.

To resolve this problem, in one embodiment, the regulator circuit that outputs signal 135 is eliminated and oscillator 120 is modified to include an additional inverter stage. In this embodiment, pump 140 is left on and the excessive current generated by pump 140 is sunk into ground via a large resistor. Unfortunately, this method results in excessive and unnecessary current being dumped into ground during the high-voltage cycle.

In another embodiment shown in FIG. 2, a charge pump system 200 provides staggered voltages on a common line to minimize the voltage ripple of a pumped voltage Vout. In charge pump system 200, if internal voltage Vin is low compared to the desired internal voltage, then regulation circuit 201 increases the oscillation of ring oscillator stages 202, thereby increasing voltage Vout (and also, logically, Vin). If voltage Vin is high compared to the desired internal voltage, then regulation circuit 201 decreases the oscillation of ring oscillator stages 202, thereby decreasing voltages Vout and Vin (which is a function of voltage Vout).

To trigger this function, regulation circuit 201 includes a voltage divider 206 that receives pumped voltage Vout and generates internal voltage Vin. Differential amplifier 205 receives this internal voltage Vin as well as a reference voltage Vref, which is selected to be above the desired output voltage of voltage divider 206. Thus, if the output voltage of voltage divider 206 is, for example, 5 volts, then reference voltage Vref could be 5.5 volts. If voltage Vin is greater than voltage Vref, then differential amplifier 205 outputs a logic zero until voltage Vout decreases appropriately. If voltage Vin is less than voltage Vref, then differential amplifier 205 outputs a logic one until voltage Vout increases appropriately.

In charge pump system 200, ring oscillator stages 202 provide output clock signals to charge pumps 204 (via clock drivers 203) in a staggered series. It logically follows that charge pumps 204, all being identical, provide staggered output signals. Because charge pumps 204 provide their staggered output voltages to a common line, voltage Vout remains relatively constant. Detailed information regarding charge pump system 200 is provided in U.S. Pat. No. 5,553,030, which is incorporated by reference herein.

However, charge pump system 200 fails to address the problem of a significant overshoot of voltage Vout. Specifically, if a significant overshoot in Vout occurs, then considerable time is needed to reduce voltage Vout to a desired level. Therefore, a need arises for a charge pump system that quickly compensates for an overshoot in the desired pumped voltage.

SUMMARY OF THE INVENTION

The charge pump system of the present invention includes a ring oscillator for generating a clock signal having a frequency, a charge pump for receiving the clock signal and generating a pumped voltage, and a regulation circuit for receiving the pumped voltage, generating an internal voltage based on the pumped voltage, and modifying the frequency based on the internal voltage. The regulation circuit includes a plurality of differential amplifiers, each differential amplifier receiving the internal voltage.

In accordance with the present invention, the frequency of the oscillator is based on the output signals from the differential amplifiers. Specifically, each differential amplifier, in addition to receiving the internal voltage, also receives a different reference voltage. In this manner, the higher the internal voltage, the larger the number of differential amplifiers that output a predetermined logic signal. In one embodiment, this predetermined logic signal is a logic one signal.

In the present invention, this predetermined logic signal modifies, i.e. reduces, an original frequency of the oscillator. The oscillator of the present invention includes a plurality of stages, each stage including an inverting element and a modifiable load coupled to an output node of the stage. The modifiable load comprises a plurality of load control circuits, each load control circuit receiving an output signal of a differential amplifier.

In one embodiment, the load control circuit includes a pass gate coupled between the node of the stage and a capacitive element. The capacitive element is further connected to ground. The pass gate, controlled by the output signal of the differential amplifier, selectively connects the capacitive element to the output node of the stage.

In this manner, each differential amplifier, if outputting the predetermined logic signal (and thereby turning on the pass gate), triggers a particular frequency response of the oscillator by increasing the load on the output nodes of every stage. Increasing the load on each output node slows down the clock signal generated by the oscillator. Slowing down the clock signal generated by the oscillator in turn slows down the charge pump. Slowing down the charge pump means it generates less current. Because resistances in the charge pump system remain constant, the pumped and internal voltages decrease accordingly. In this manner, the charge pump system of the present invention quickly compensates for any overshoot in the pumped voltage in a manner directly correlated to the magnitude of the pumped voltage.

On the other hand, if no differential amplifiers output the predetermined logic signal, then no loads are added to the oscillator. Thus, the oscillator generates its original, unmodified frequency. In this manner, the charge pump system of the present invention quickly compensates for any undershoot in the pumped voltage by using the fastest frequency.

In another embodiment, of the differential amplifiers outputting the predetermined logic signal, a selection circuit selects the output signal of the differential amplifier resulting in the lowest frequency and passes this signal to the oscillator. In this manner, only one load control circuit is enabled in each stage of the oscillator. Therefore, the present invention can also significantly reduce the energy resources for operating the oscillator.

DETAILED DESCRIPTION OF THE DRAWINGS

Figure 1A:
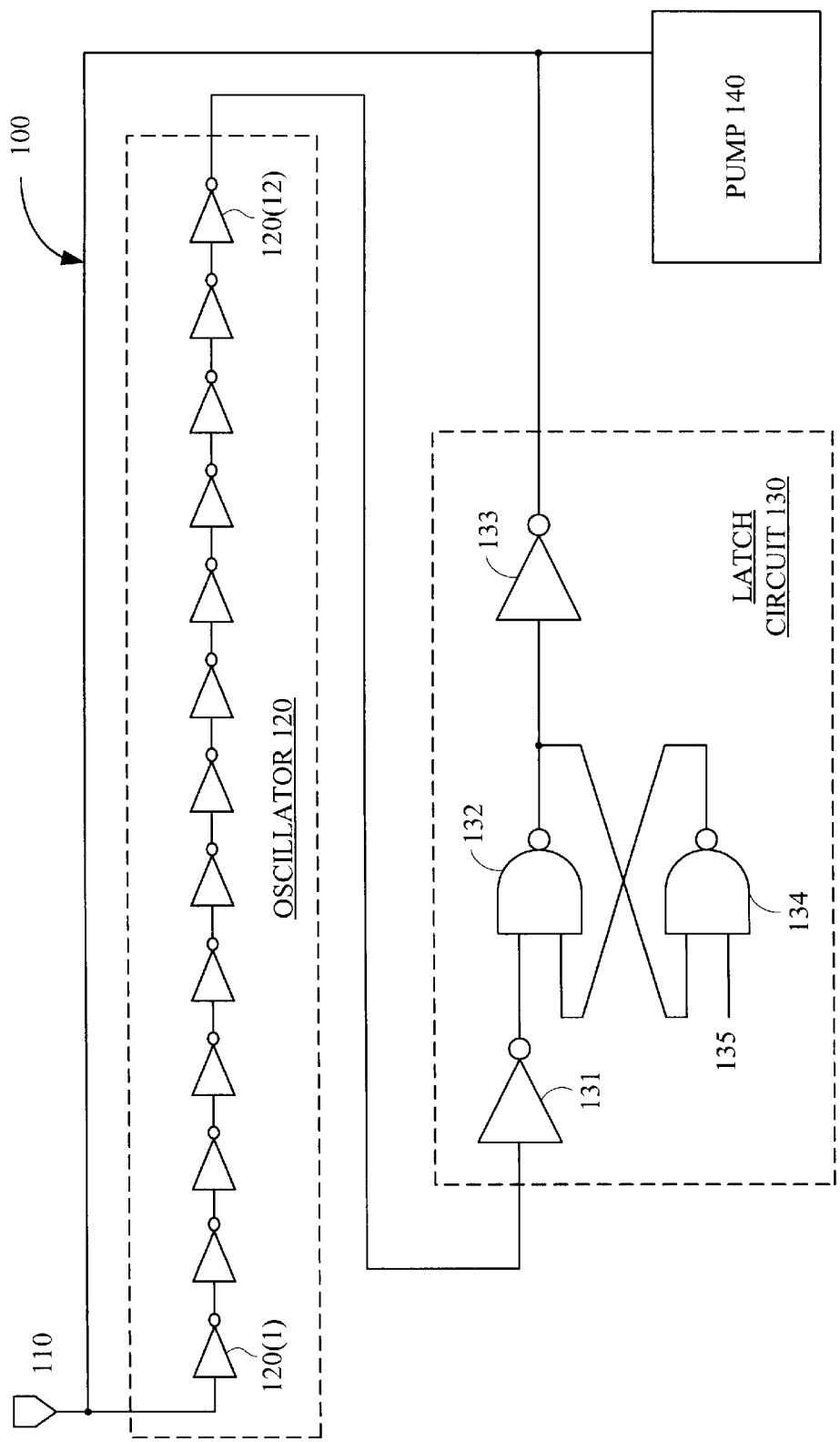
FIG. 1A illustrates a known charge pump system including a disable/enable circuit for turning off/on a charge pump.
Figure 1B:
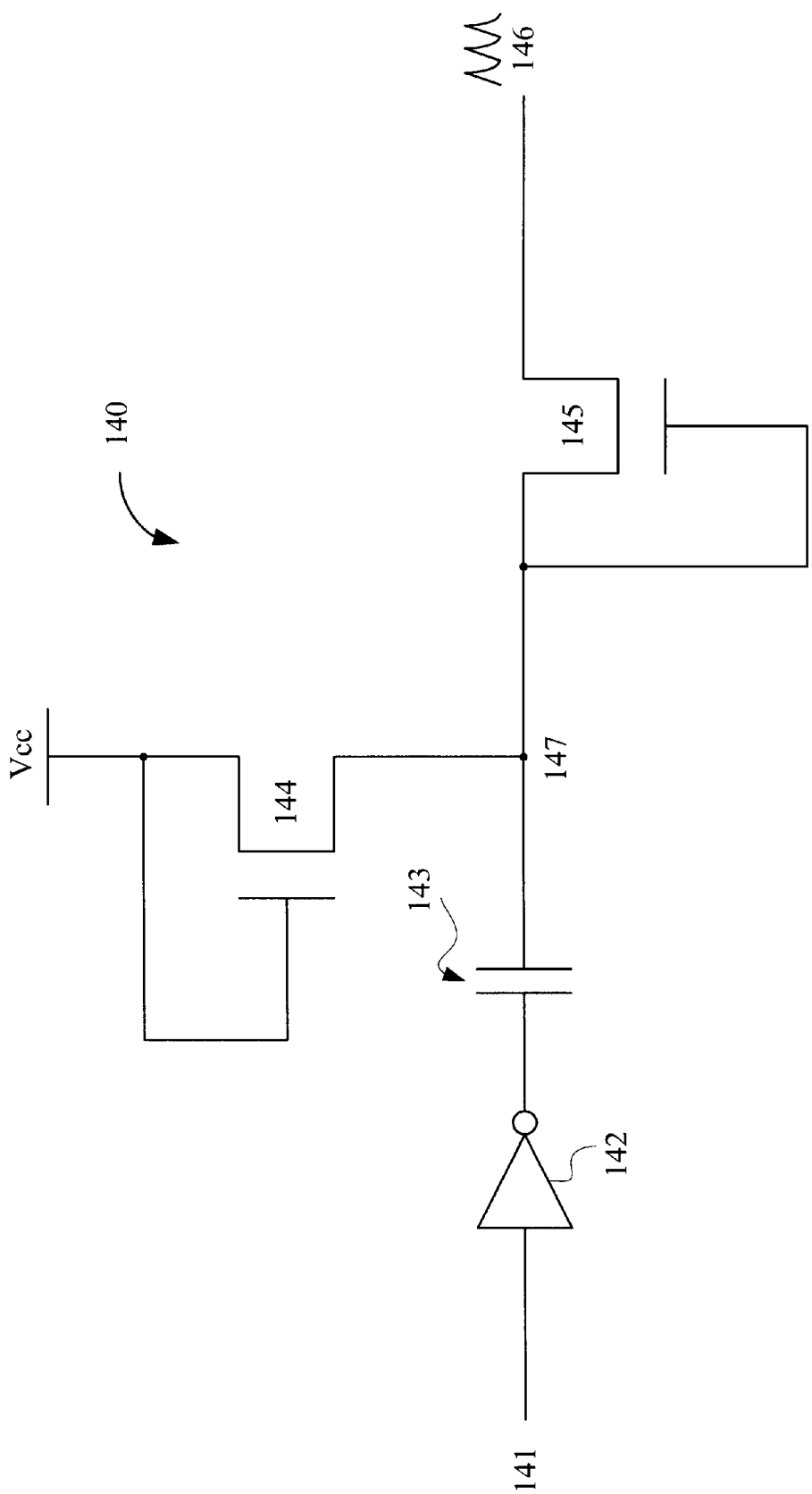
FIG. 1B illustrates a known charge pump.
Figure 2:
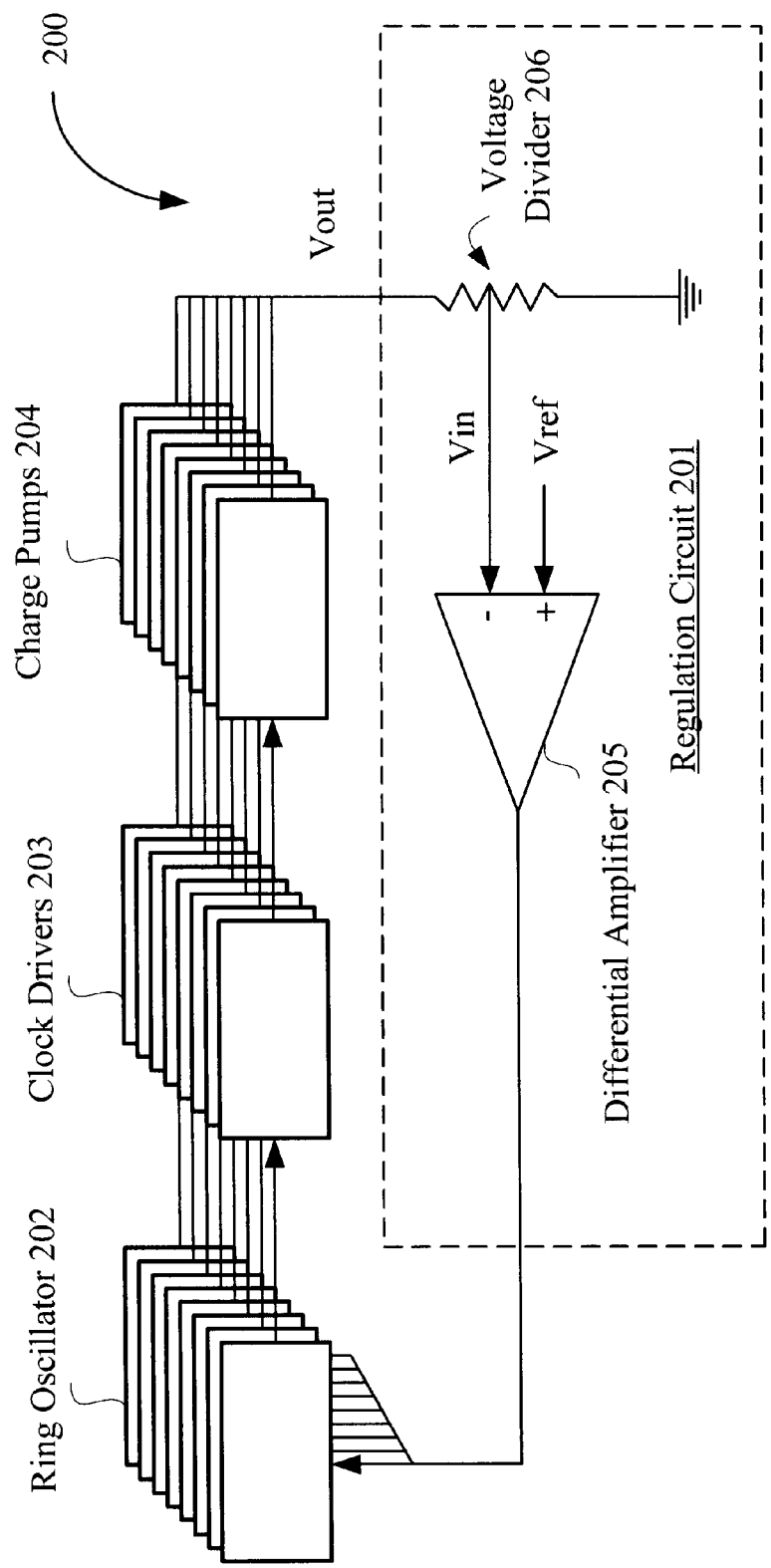
FIG. 2 illustrates a known frequency controlled charge pump system.
Figure 3:
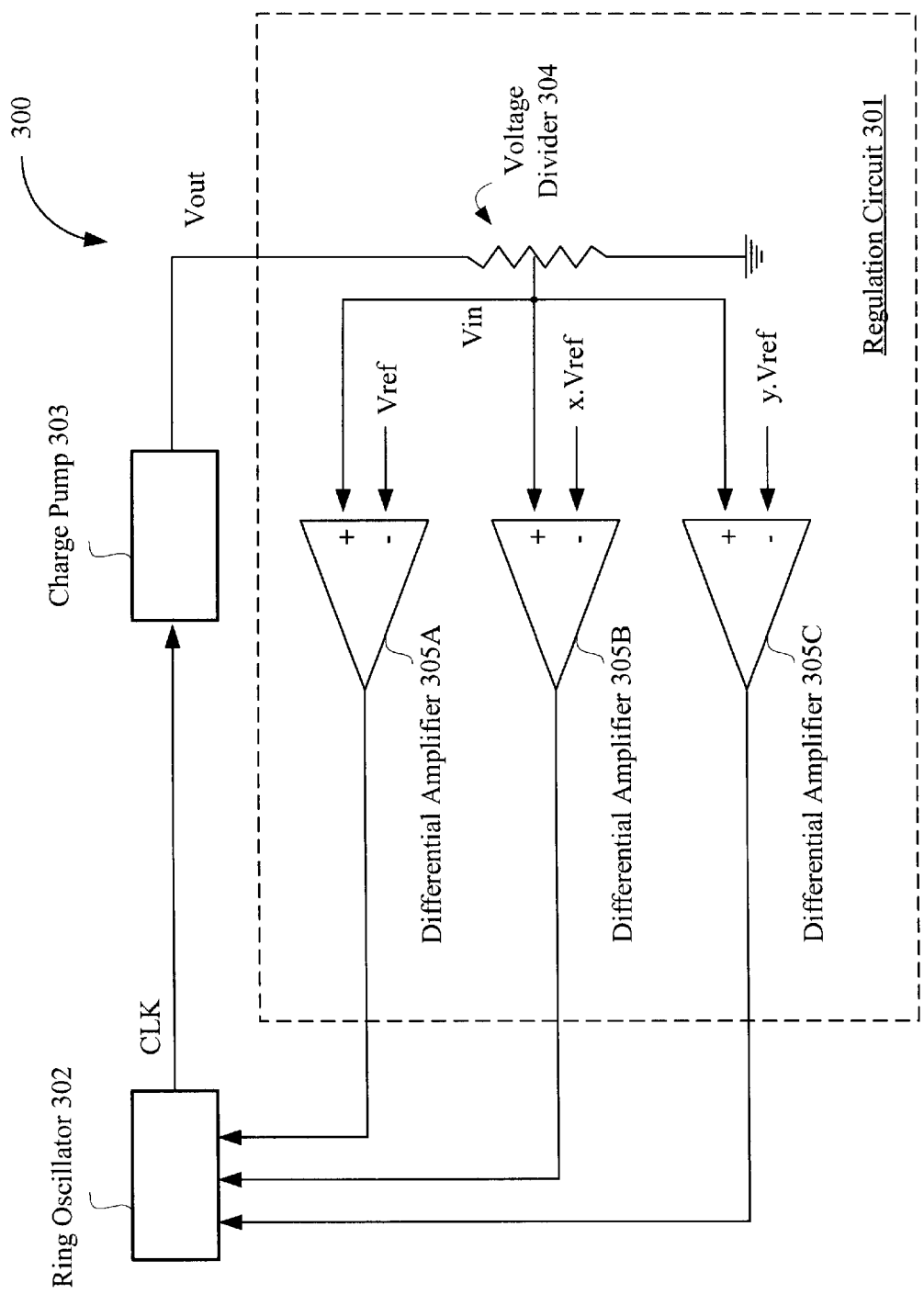
FIG. 3 illustrates a frequency controlled charge pump system for positive high voltage regulation in accordance with the present invention.

FIG. 3 illustrates a charge pump system 300 in accordance with the present invention. Charge pump system 300 includes a regulation circuit 301, a ring oscillator 302 for receiving a plurality of signals from regulation circuit 301 and generating a driven clock signal CLK, and a charge pump 303 for generating an output voltage (i.e. pumped voltage) Vout based on the driven clock signal CLK. Note that voltage Vout actually varies between Vcc and Vcc+$\Delta$V, wherein $\Delta$V is determined in part by the number of stages included in charge pump 303 (described in detail below). Therefore, a reference herein to voltage Vout refers to the maximum Vout, i.e. Vcc+$\Delta$V.

Regulation circuit 301 includes a plurality of differential amplifiers 305A, 305B, and 305C that all receive an internal voltage Vin generated by a voltage divider 304. Note that although three differential amplifiers 305 are provided in this embodiment, other embodiments may include more or less amplifiers. Voltage divider 304, coupled between voltage Vout and ground, is a standard element known by those skilled in the art and therefore is not described in detail herein. Given voltage Vout and ground, internal voltage Vin is set by the ratio of the resistors or resistor-like elements (only one shown) in voltage divider 304. Because any increase in Vout results in an increase in Vin, voltage Vin is an accurate measure of output voltage Vout.

In accordance with the present invention, each differential amplifier 305 receives a different reference voltage. If voltage Vin is greater than the reference voltage, then the differential amplifier outputs a logic one signal. In contrast, if voltage Vin is less than the reference voltage, then the differential amplifier outputs a logic zero signal. In the embodiment shown in FIG. 3, differential amplifier 305A receives a first reference voltage Vref, differential amplifier 305B receives a second reference voltage x.Vref, and differential amplifier 305C receives a third reference voltage y.Vref. Reference voltages x.Vref and y.Vref could be, but are not limited to, multiples of reference voltage Vref (wherein x and y are both greater than 1). In one illustrative implementation, voltages Vout (desired), Vin (desired), Vref, x.Vref, and y.Vref are respectively, 8.0, 2.0, 2.1, 2.2, and 2.3 Volts.

In this configuration, the higher voltage Vin is, the greater the number of differential amplifiers 305 that output a logic one signal. For example, if voltage Vin increases to 2.5 Volts and assuming the reference voltages given above, then differential amplifiers 305A, 305B, and 305C will all output logic one signals. In other words, voltage Vin is greater than Vref, x.Vref, and y.Vref. However, if voltage Vin decreases to 2.25 Volts, then only differential amplifiers 305A and 305B will output logic one signals (voltage Vin is only greater than Vref and x.Vref). If voltage Vin decreases further to 2.15 Volts, then only differential amplifier 305A will output a logic one signal (voltage Vin is only greater than Vref). Finally, if voltage Vin decreases below Vref to 1.9 Volts, then all differential amplifiers 305 will output a logic zero signal.

In accordance with the present invention, the frequency of the clock signal CLK generated by ring oscillator 302 is based on the output signals from differential amplifiers 305. Specifically, the signals provided by differential amplifiers 305A–305C determine which differential amplifiers) 305, if any, change the unmodified frequency f of ring oscillator 302.

In one embodiment of the present invention, each differential amplifier 305 that outputs a logic one signal modifies frequency f. The more differential amplifiers that output a logic one signal, the slower the clock signal CLK. For example, if voltage Vin is greater than reference voltage Vref but less than x.Vref (differential amplifier 305A outputting a logic one signal), then the frequency is only slightly slowed. If voltage Vin is greater than reference voltage x.Vref but less than y.Vref (differential amplifiers 305A and 305B outputting a logic one signal), then the frequency is moderately slowed. However, if voltage Vin is significantly over reference voltage Vref, i.e. greater than y.Vref (all differential amplifiers 305A–305C) outputting a logic one signal), then the frequency is significantly slowed. Slowing down the clock signal CLK of oscillator 302 in turn slows down charge pump 303. Slowing down charge pump 303 means it generates less current. Because resistances in charge pump system 300 remain constant, voltages Vout and Vin decrease accordingly.

On the other hand, if voltage Vin is less than reference voltage Vref, then no differential amplifiers 305 output a logic one signal. In this case, the frequency f of ring oscillator 302 remains unmodified. In this manner, the present invention ensures that the fastest frequency, i.e. unmodified frequency f, is used to compensate for an undershoot of the desired voltage Vin.

In one embodiment, a single differential amplifier outputting a logic one signal could generate a frequency of 3f/4, two differential amplifiers outputting a logic one signal could generate a frequency of f/2, and three differential amplifiers outputting a logic one signal could generate a frequency of f/4. Therefore, if an unmodified frequency f of 10 MHz is generated by oscillator 302, then the charge pump system of the present invention could generate 10 MHz, 7.5 MHz, 5.0 MHz, and 2.5 MHz.

Figure 4:
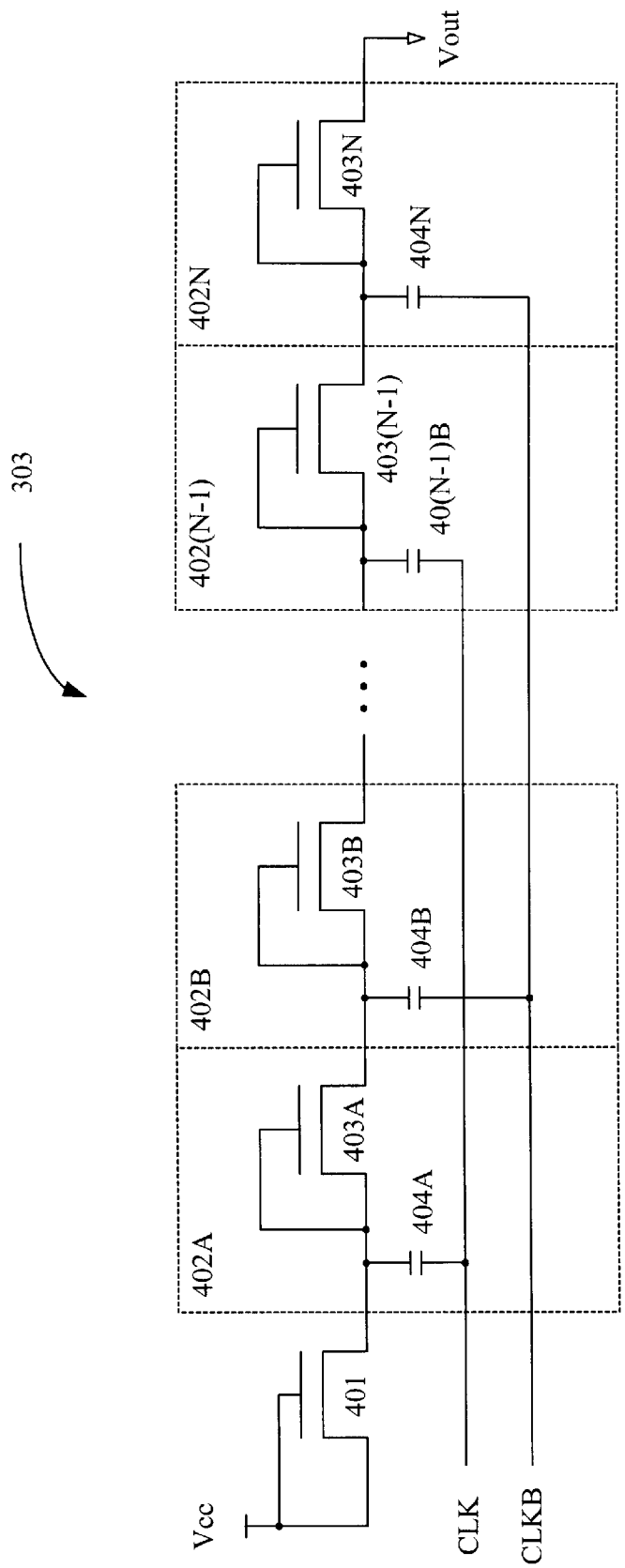
FIG. 4 illustrates a pump used in one embodiment of the present invention.

FIG. 4 illustrates one embodiment of charge pump 303 that can be used in the present invention. A transistor 401 has its gate and source coupled to voltage source Vcc. In this configuration, transistor 401 provides a weak pull-up signal to the first stage, i.e. stage 402A, of charge pump 303. Charge pump 303 includes a plurality of stages 402–402N, each stage 402 receiving clock signal CLK or an inverted clock signal CLKB via a capacitor 404. Each stage 402 further includes a transistor 403A having its gate coupled to its drain. In this configuration, when one terminal of a capacitor 404 receives a logic one signal (CLK or CLKB), the other terminal of that capacitor 404 receives a portion of that signal, thereby providing an incremental increase to the output voltage of the previous stage. That increased voltage turns on associated transistor 403 and passes the increased voltage (minus the threshold voltage of transistor 403) to the next stage 402. In charge pump 303, by using both CLK and CLKB, half of capacitors 404 charge while the other half discharge. As known by those skilled in the art, the final value of voltage Vout is a function of the frequency of clock signal CLK, the number of stages 402, and the sizing of capacitors 404.

Figure 5:
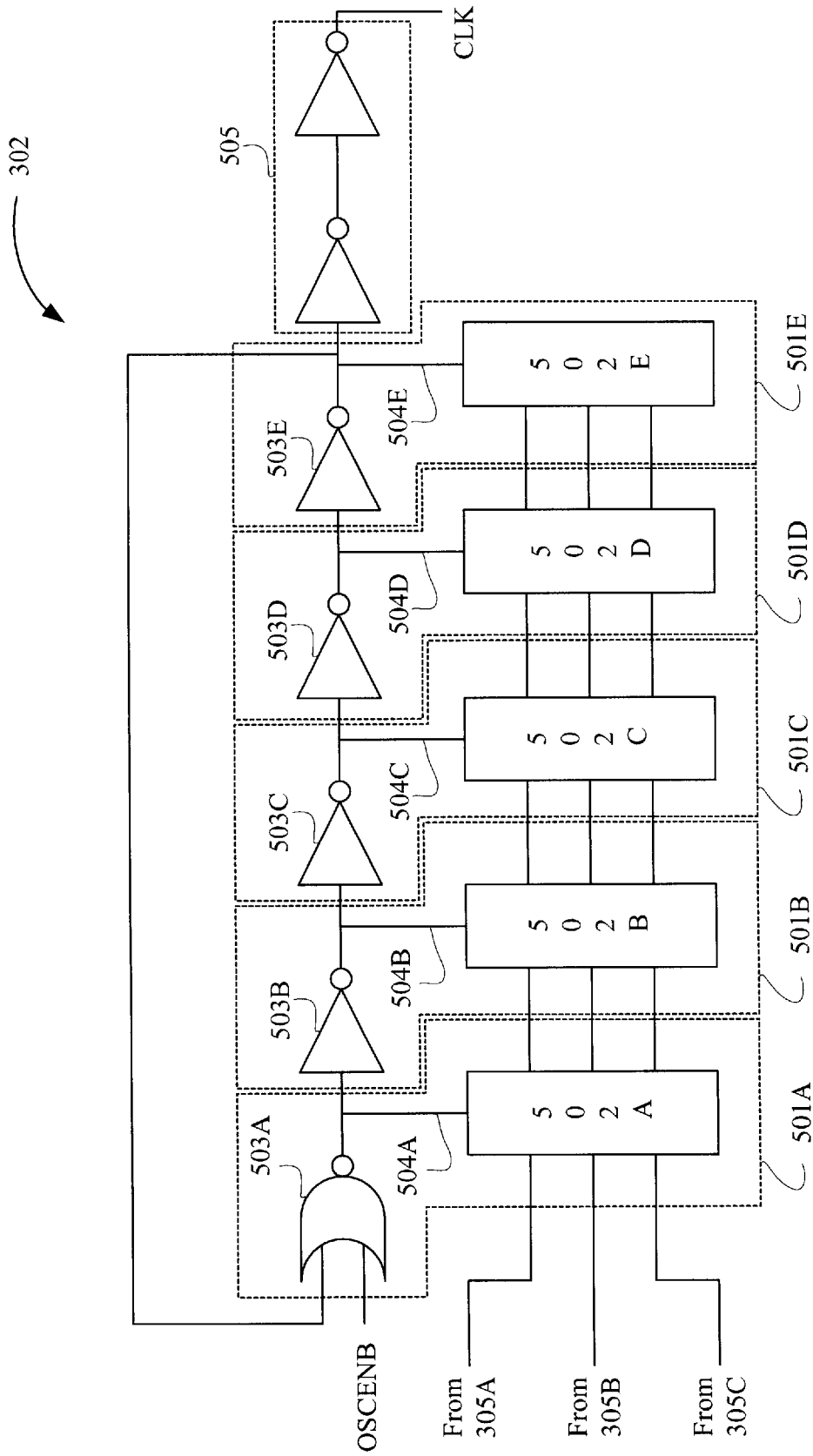
FIG. 5 illustrates one embodiment of the ring oscillator of the present invention having selectable loads at each stage of the oscillator.

FIG. 5 illustrates one embodiment of ring oscillator 302. In this embodiment, ring oscillator 302 includes five stages 501A–501E. In first stage 501A, a NOR gate 503A receives an enable/disable signal OSCENB. If signal OSCENB is a logic zero signal, then NOR gate 503A functions as an inverter. In this configuration and in combination with inverters 503 in the remaining stages 501, ring oscillator 302 is enabled. On the other hand, if signal OSCENB is a logic one signal, then NOR gate 503A always outputs a logic zero signal. In this configuration, the even number of inverters 503 ensure that no oscillation occurs. Therefore, oscillator 302 is disabled. Driver 505 sharpens the output signal provided by the last stage of oscillator 302, i.e. stage 501E.

Figure 6:
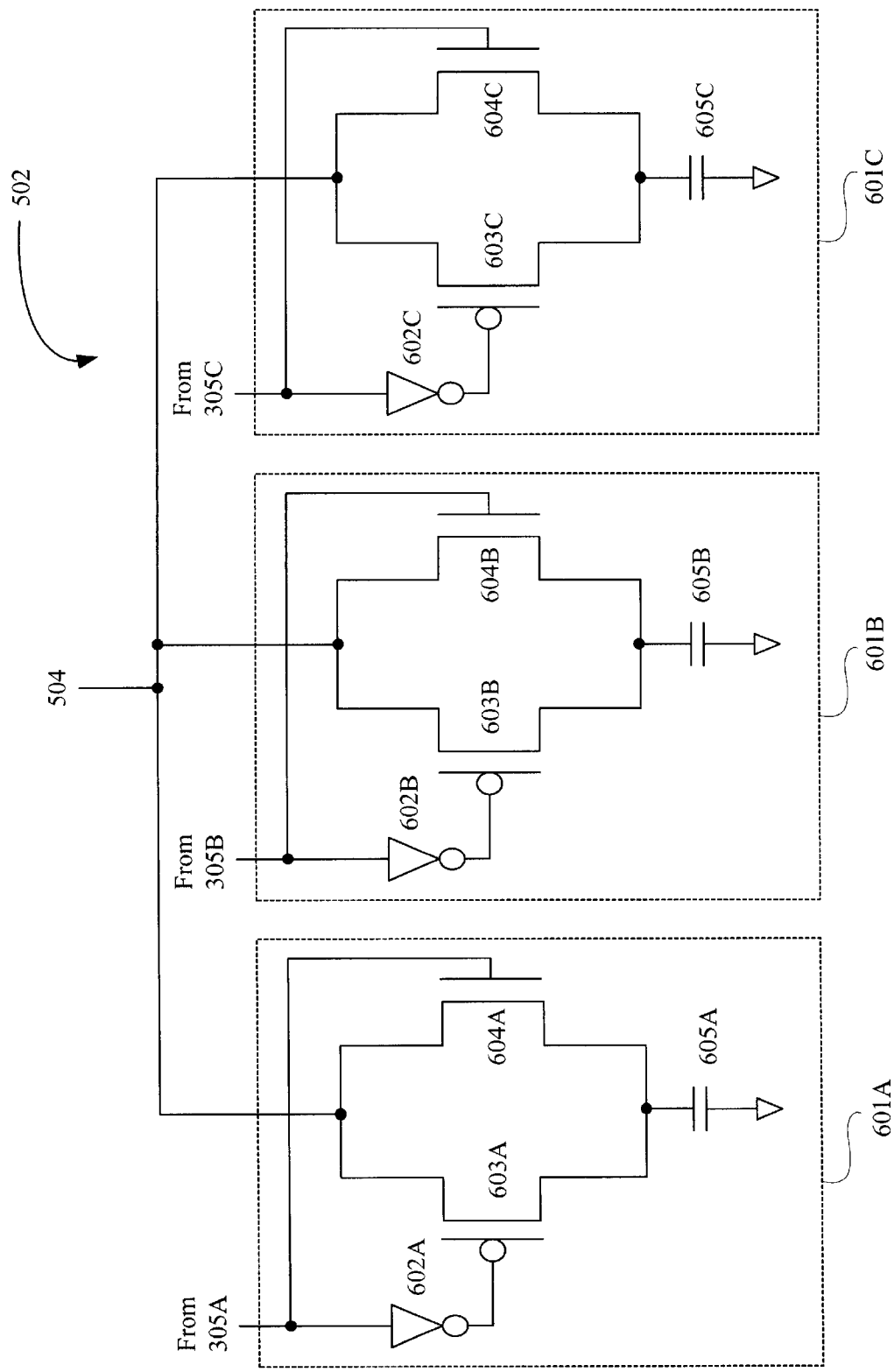
FIG. 6 illustrates a selectable load including capacitors that can be used in the present invention.

In accordance with the present invention, each output node 504 of stage 501 is coupled to a modifiable load 502 which is activated by the output signals of differential amplifiers 305A, 305B, and 305C. FIG. 6 illustrates one embodiment of a load 502. In this embodiment, load 502 includes three load control circuits 601A, 601B, and 601C, receiving output signals from differential amplifiers 305A, 305B, and 305C, respectively. Each load control circuit 601 includes a pass gate formed by an inverter 602A, a PMOS transistor 603, and an NMOS transistor 604. The pass gate is coupled between a capacitor 605 and the output node 504. Capacitor 605 is further coupled to ground.

In this configuration, a logic one signal from differential amplifier 305 turns on both transistors 603 and 604, thereby coupling capacitor 605 to node 504. The capacitive loading of capacitor 605 on node 504 is based on the size of this device. In the present invention, the total capacitive loading on node 504 can be advantageously modified based on the output signals of differential amplifiers 305. Specifically, each differential amplifier 305 outputting a logic one signal slows down oscillator 302 a predetermined amount by providing a predetermined capacitive loading on output nodes 504. In this manner, the charge pump system of the present invention quickly compensates for any overshoot in the pumped voltage in a manner directly correlated to the magnitude of the pumped voltage.

Capacitors 605A, 605B, and 605C can be identically sized or can have different sizes. In one embodiment, capacitors 605 are formed with transistors using standard CMOS technology, which is well known in the art. The number of capacitors 605, and thus the number of control circuits 601, is typically the same as the number of differential amplifiers 305.

Figure 7:
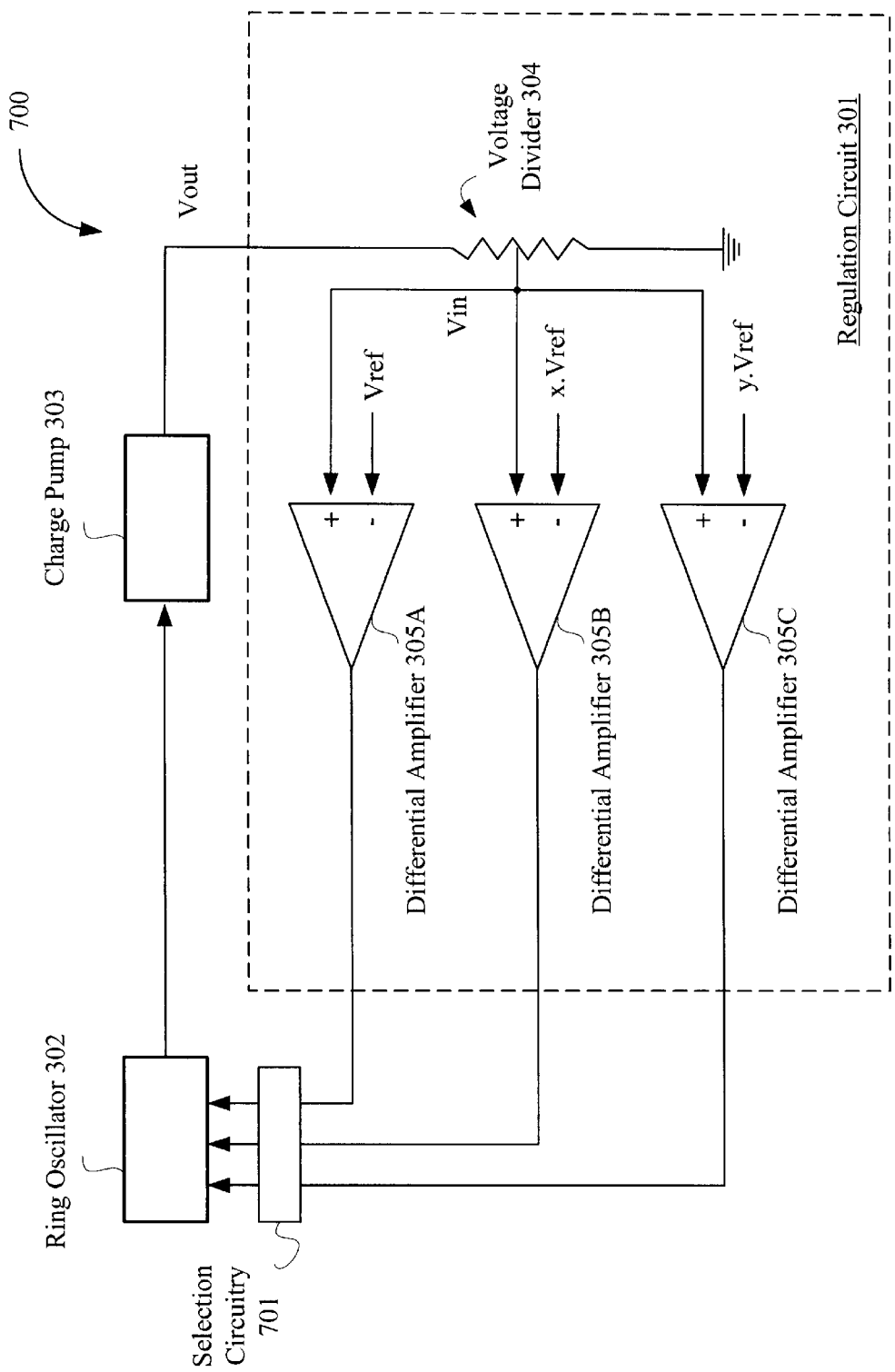
FIG. 7 illustrates another embodiment of a frequency controlled charge pump system for positive high voltage regulation in accordance with the present invention.

In another embodiment of the present invention shown in FIG. 7, charge pump system 700 includes selection circuitry 701 for selecting the logic one signal of at most one of differential amplifiers 305. In this embodiment, each differential amplifier 305 reduces frequency f to a unique, predetermined value. Specifically, each capacitor 605 (FIG. 6) is sized to provide a different load. For example, a logic one signal from only differential amplifier 305A could reduce the frequency of oscillator 302 to 2f/3, a logic one signal from only differential amplifier 305B could reduce the frequency of oscillator 302 to f/2, and a logic one signal from only differential amplifier 305C could reduce the frequency of oscillator 302 to f/3.

Selection circuitry 701 selects the differential amplifier 305 outputting a logic one signal and providing the lowest frequency. In one embodiment, selection circuitry 701 comprises a standard decoding circuit and therefore is not explained in detail herein. Thus, assuming an unmodified frequency f of 10 MHz, selecting differential amplifier 305A reduces the frequency of oscillator 302 to 6.6 MHz, selecting differential amplifier 305B reduces the frequency of oscillator 302 to 5.0 MHz, and selecting differential amplifier 305C reduces the frequency of oscillator 302 to 3.3 MHz.

In this embodiment, if voltage Vin is 2.5 Volts, then differential amplifier 305C is selected, because 3.3 MHz is the lowest frequency generated by any differential amplifiers 305 outputting a logic one signal (in this case, all differential amplifiers output logic one signals). If voltage Vin is 2.25 Volts, then differential amplifier 305B is selected, because 5.0 MHz is the lowest frequency generated by any differential amplifiers 305 outputting a logic one signal (in this case, differential amplifiers 305A and 305B output logic one signals). If voltage Vin is 2.15 Volts, then differential amplifier 305A is selected, because 6.6 MHz is the lowest frequency generated by any differential amplifiers 305 outputting a logic one signal (in this case, only differential amplifier 305A outputs a logic one signal). In this manner, charge pump system 700 advantageously runs at the lowest frequency, thereby optimizing energy resources.

Figure 8:
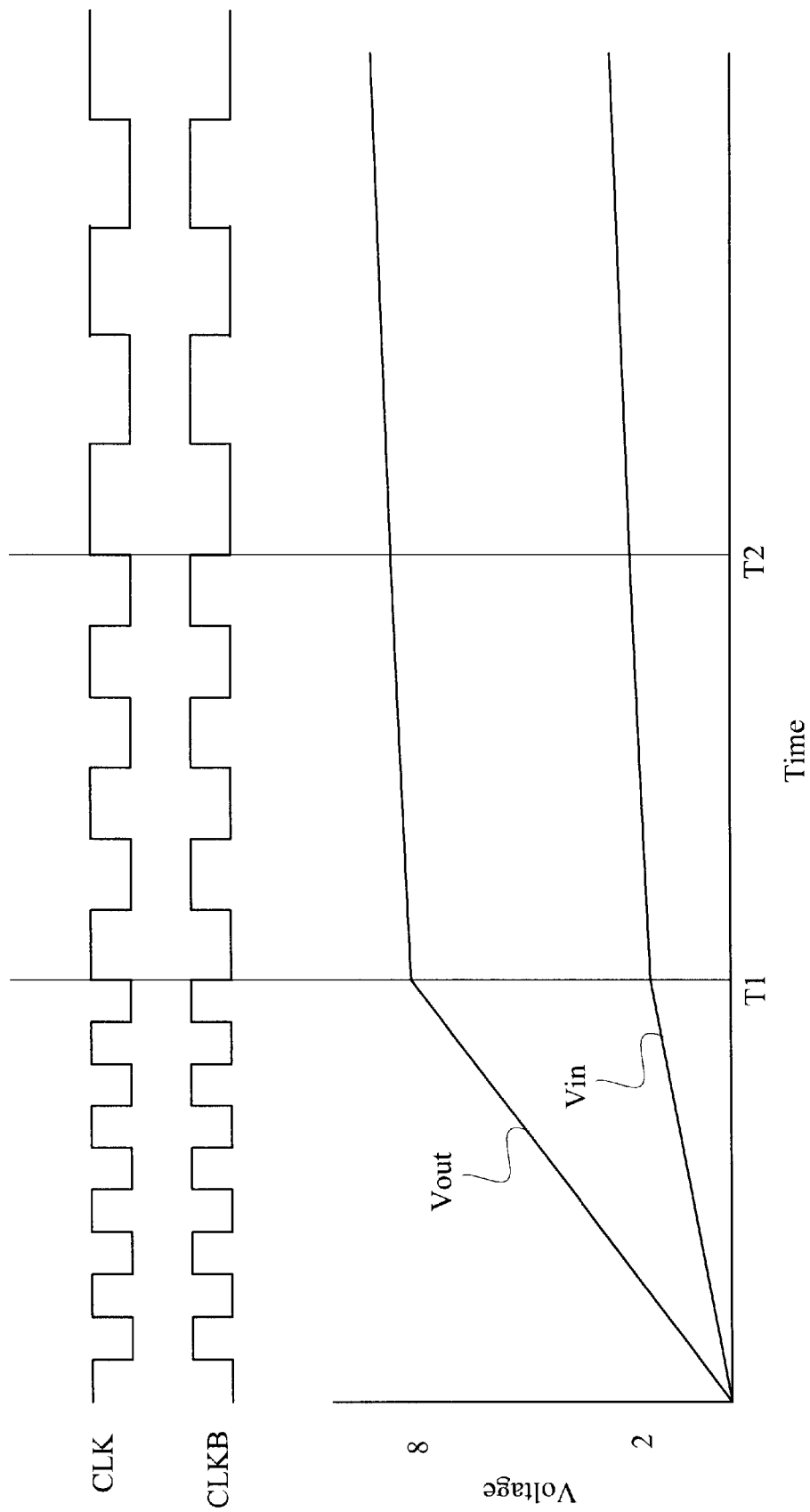
FIG. 8 illustrates a graph of the pumped voltage and the internal voltage versus time.

FIG. 8 illustrates a graph of voltages Vout and Vin over time as well as associated clock signals CLK and CLKB. Using the illustrative voltages above, the output voltage of charge pump 303, voltage Vout, rises to 8.0 Volts at time T1. Recall that 8.0 Volts is the maximum desired output voltage. Voltage Vin, generated by voltage divider 304, has a maximum desired voltage of 2.0 Volts. Voltage Vin "follows" voltage Vout to this maximum value at time T1.

However, at time T1, Vout (and thus logically Vin) continues to increase, thereby overshooting the maximum desired voltage. In this case, in accordance with the present invention, a first load control circuit 601 is enabled, thereby slowing down the frequency of clock signals CLK/CLB a first predetermined amount as shown in FIG. 8. If Vout/Vin continue to rise as indicated at time T2, then a second load control circuit 601 is enabled, thereby slowing down the frequency of clock signals CLK/CLB a second predetermined amount as also shown in FIG. 8.

This frequency slowing process continues until voltages Vout/Vin decrease. At this point, one or more load control circuits are disabled, thereby allowing the frequency to increase (not shown). Note that because both clock signals CLK and CLKB are used by charge pump 303 and due to the heavy loading on the output of charge pump 303, the oscillation of Vout/Vin is typically within 0.2 or 0.3 volts of the desired voltage. The present invention can quickly and effectively minimize any such oscillation by providing the appropriate reference voltages and associated loads.

The present invention can be used for any integrated circuit where a positive high voltage is necessary. The illustrative voltages and frequencies described herein are merely provided to show one embodiment of the present invention. Clearly, other voltages and frequencies can be provided in other embodiments. Modifications to the present invention will be apparent to those skilled in the art. Therefore, only the appended claims limit the present invention.

What is claimed is:

1. A system for positive voltage regulation, the system comprising:
    a ring oscillator;
    a charge pump coupled to an output of the ring oscillator; and
    a regulation circuit coupled to the output of the charge pump and an input of the ring oscillator, wherein the regulation circuit includes a plurality of differential amplifiers, each differential amplifier receiving a different reference voltage.

2. The system of claim 1, wherein the ring oscillator includes selection circuitry for generating a modifiable frequency.

3. The system of claim 2, wherein the selection circuitry selectively uses an input signal from one of the plurality of differential amplifiers to modify the frequency.

4. The system of claim 1, wherein the ring oscillator includes a plurality of stages, wherein each stage includes load control circuitry for generating a modifiable load.

5. The system of claim 4, wherein the load control circuitry includes N load control circuits, wherein N is the number of the differential amplifiers.

6. The system of claim 5, wherein each load control circuit includes:
    a pass gate coupled to an output node of its stage and an output terminal of a differential amplifier; and
    a capacitor coupled between the pass gate and ground.

7. The system of claim 6, wherein each capacitor provides a substantially identical load.

8. The system of claim 6, wherein each capacitor provides a substantially different load.

9. The system of claim 6, wherein at least one capacitor is formed with a transistor.

* * * * *